United States Patent [19]
Crane

[11] 4,352,185
[45] Sep. 28, 1982

[54] GAS LASER HAVING IMPROVED STABILITY AGAINST ENVIRONMENTAL CONDITIONS

[75] Inventor: Dale E. Crane, Sunnyvale, Calif.

[73] Assignee: Uniphase Corporation, Mountain View, Calif.

[21] Appl. No.: 169,989

[22] Filed: Jul. 18, 1980

[51] Int. Cl.³ ............................................. H01S 3/13
[52] U.S. Cl. ....................................... 372/29; 372/32
[58] Field of Search ................. 331/94.5 D, 94.5 C, 331/94.5 G

[56] References Cited

U.S. PATENT DOCUMENTS

| | | | |
|---|---|---|---|
| Re. 27,282 | 2/1972 | Kolb, Jr. ............................ | 313/217 |
| 3,766,487 | 10/1973 | Roux ............................. | 331/94.5 PE |
| 3,775,700 | 11/1973 | Garman et al. ................ | 331/94.5 D |
| 3,784,927 | 1/1974 | Rudolph ......................... | 331/94.5 D |
| 3,988,698 | 10/1976 | Crane et al. .................... | 331/94.5 D |
| 4,081,762 | 3/1978 | Gloser et al. ................... | 331/94.5 D |
| 4,132,961 | 1/1979 | Bergman ....................... | 331/94.5 PE |
| 4,238,743 | 12/1980 | Gloser et al. ................... | 331/94.5 D |

Primary Examiner—William L. Sikes
Assistant Examiner—Leon Scott, Jr.
Attorney, Agent, or Firm—C. Michael Zimmerman

[57] ABSTRACT

The laser is an internal mirror hermetically sealed design, utilizing an envelope made principally of glass. The effects of thermally produced distortion on mirror alignment are minimized by providing a thermally and electrically conductive liner in close contact with the envelope wall. Misalignment of the discharge-confining capillary tube is minimized by supporting its inner end by means of a concentric stiff but resilient spring, thus avoiding an unsupported cantilevered section of the capillary. Reliable starting even in environments where the ambient electromagnetic radiation is inadequate for gas ionization is secured by providing a radioactive source in the region of the anode electrode.

14 Claims, 3 Drawing Figures

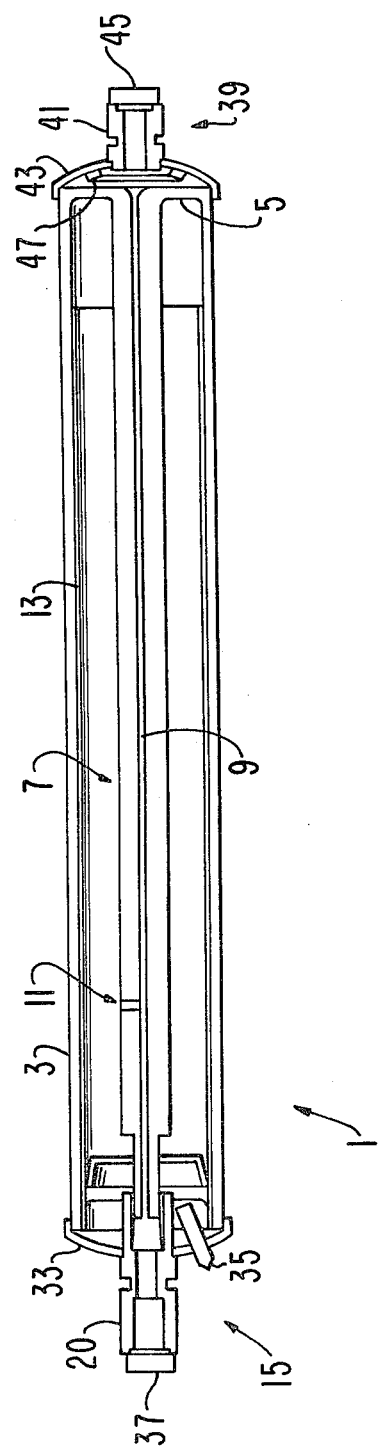

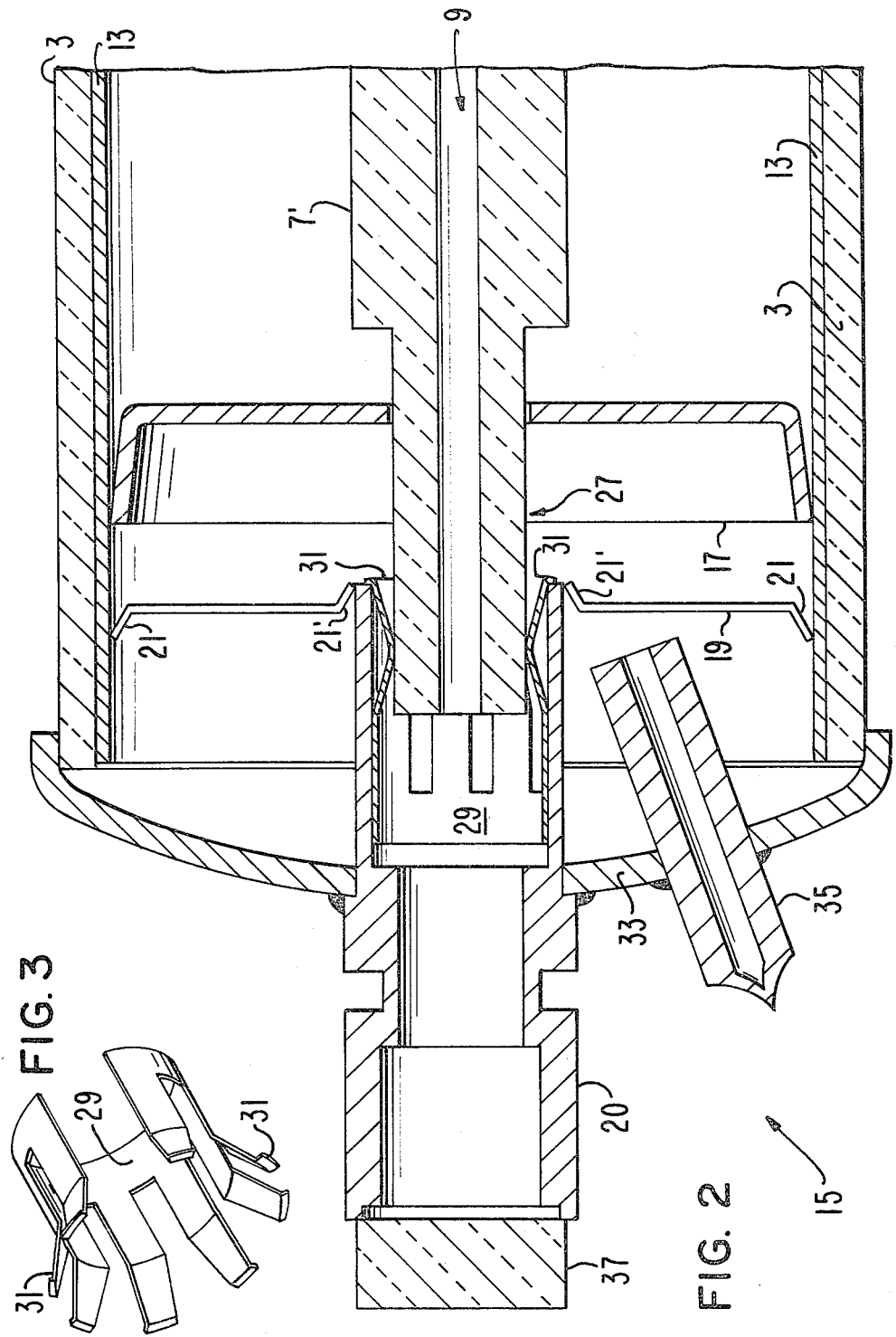

GAS LASER HAVING IMPROVED STABILITY AGAINST ENVIRONMENTAL CONDITIONS

BACKGROUND OF THE INVENTION

Among practical lasers in widespread use, gas lasers offer some considerable advantages over the solid semiconductor and crystal lasers. The most representative species of gas laser, the helium-neon laser, is easily the most commonly used laser of any type. In fact helium-neon lasers comprise well over half of all lasers in use today. One of the principal reasons for this is certainly the ability of the helium-neon medium to operate stably and reliably at 0.6328 microns, in the visible light range. However, low initial cost is also an important factor in the common use of this laser type.

The operation of gas lasers such as the helium-neon type depends upon the establishment of a glow discharge within a confined column of the gaseous mixture between a pair of electrodes under the influence of a powerful electric field produced by the application of a large potential difference between the electrodes.

The resulting plasma discharge produces a population inversion in which one or more upper energy levels of a gaseous component is artificially overpopulated. The consequent transitions from such an upper energy level to one or more lower levels release energy of discrete wavelengths associated with the transitions concerned.

By providing an optically resonant cavity in the form of a pair of mirrors, one at each end of the glow discharge column, the establishment of reliable and steady operation at a desired one of the possible wavelengths attainable from the lasing medium is possible.

However, in order to provide that the laser be stable in operation, relatively resistant to thermal and mechanical shock, and capable of being started without the excessive application of voltage, a number of important problems must be dealt with in practice.

In particular, the optical axis of the mirror pair must be well aligned with the central axis of the discharge-confining tube or capillary, or else diffraction loss will become unacceptably large, and the performance of the laser will be degraded.

While techniques have been evolved for securing such accurate alignment of the mirrors during final assembly of the laser, too little has been done in the prior art to ensure that the mirrors continue in perfect alignment despite local heating and cooling of the glass envelope of the laser. Such local heating or cooling of portions of the laser envelope result frequently from the mounting of the laser, together with other sources of radiated and convected heat, inside an equipment cabinet, in sunlight, or exposed to another source of heat which tends to cause unequal temperatures to exist in different parts of the laser envelope.

Since glass is in many ways an optimum material to use in the fabrication of the envelope of the laser, it is unfortunate that it lacks the ability to conduct heat sufficiently to ensure that all parts of the envelope operate at the same temperature. Consequently, variations in ambient temperaure over the surface of the envelope are all too often reflected by significant envelope temperature gradients in a direction circumferentially around the tube envelope.

The effect of such gradients is to cause a very slight "sausaging" (bowing or sagging) of the envelope such that the initially near-perfect mirror alignment can easily be lost. One very important result of the misalignment is that "pointing stability", a term used to describe the extend to which the laser is free of angular deviation of the axis of the light beam over a period of time, is substantially degraded. Moreover, there can be sufficient diffraction loss in the optical cavity to significantly reduce power output or, in extreme cases, to prevent successful sustained oscillation such that the laser operation becomes erratic or ceases altogether.

A second problem encountered in practical forms of prior art lasers has been the inadequate support provided to the end of the discharge-confining or capillary tube. Since the bore through this capillary tube may be as little as one millimeter or less while its length may be on the order of 170 millimeters, or more; it becomes obvious that very little flexure of the capillary tube can be tolerated without causing significant misalignment and non-linearity of its axis.

Some prior art lasers of the general type under consideration (see for example U.S. Pat. No. 3,988,698) have supported the "free" end of the capillary (the end not joined to the outer envelope wall) only by means of a rather imprecise and inadequate support, which permitted an unacceptable amount of capillary tube movement in response to shock or vibration. Furthermore, the support was often positioned intermediate the ends of the capillary leaving a cantilevered, unsupported end section, thus compounding the problem.

Other prior art gas lasers have simply provided no capillary tube support inside the laser envelope, such that the entire capillary length was supported as a cantilever from the end joined to the outer envelope wall.

Yet another problem which has affected the operation of gas discharge lasers has been difficulty in initiating the discharge. The reliable initiation of such a glow discharge without resort to excessive starting voltage levels depends upon the existence of a certain residual level of ionization in the gaseous medium. When the gaseous medium is exposed to ambient levels of daylight, photo-ionization is sufficient in most instances. In the absence of visible light (as in the case of enclosure of the glass envelope with an opaque metallic sleeve) sufficient ionization for easy starting is usually produced by a radiation background of low level cosmic rays. Under most conditions of utilization this background radiation is sufficient to provide an adequate residual ionization level in the gases such that glow discharge can be initiated reliably and fairly easily without resort to high voltage starting pulses.

However, when laser operation is attempted under conditions where substantial shielding from both visible and cosmic radiation is present, as it would be during operation in underground locations, then starting becomes unreliable, often taking several seconds to several minutes or more after the power supply is turned on.

Although there are several approaches possible to cure this problem, each has some element of undesirability. For example, while it is possible to incorporate an auxiliary light source within the opaque envelope containing the laser, such an addition is undesirably expensive in the case of low cost lasers typically used for optical instrumentation, surveying, etc. Moreover, the auxiliary light source would consume power, introduce undesirable heat, and add an additional element of possible unreliability.

As has already been noted, reliable starting can for the most part be restored even in locations of extremely low background radiation by sufficiently elevating the starting voltage available from the power supply. However, this approach is severely limited by the necessity of providing adequate electrical insulation, especially of the power supply leads and connections extending from the laser to its power supply. Consequently, this approach too is clearly undesirable.

SUMMARY OF THE INVENTION

An object of the present invention is the provision of a gas laser having improved operational stability.

A second object of the present invention is the provision of a gas laser having improved pointing stability during operation, whereby angular drift or deviation of the axis of the output beam is minimized.

A third object of the present invention is the provision of a gas laser having improved power stability during operation, whereby reductions in output power of the laser beam are minimized.

A fourth object of the present invention is the provision of a gas laser providing stable operation despite an anisotropic temperature environment.

A fifth object of the present invention is the provision of a gas laser having means to equalize the surface temperature of the laser envelope over a considerable extent thereof, despite operation in an anisotropic temperature environment.

A sixth object of the present invention is the provision of a gas laser having an electrically and thermally conductive liner disposed over a major extent of the inner wall of the envelope thereof to serve both as a cathode electrode and as an envelope-temperature equalizing means.

A seventh object of the present invention is the provision, in a gas laser of the type utilizing an internal discharge-defining capillary tube terminating at a free end within the envelope of the laser, of means to firmly but resiliently secure the free end of the capillary tube against vibration and movement in use.

An eighth object of the present invention is the provision, in a gas laser, of means to provide reliable starting even in the total absence of ambient ionizing radiation.

A ninth object of the present invention is the provision, in a gas laser, of means internal to the envelope thereof for promoting sufficient ionization of the gas to ensure easy starting of the laser.

To the above ends a gas laser according to a preferred embodiment of the present invention is constructed utilizing an elongated cylindrical glass envelope of generally tubular form having sealed over each of its ends a metallic conductive electrode assembly. Each of the electrode assemblies is centrally apertured in alignment with the axis of the envelope, the apertures in the electrode assemblies being closed by a pair of mirrors reflective at the wavelength of light to be produced by the laser.

A discharge-defining capillary tube extends generally coaxially into the envelope from a point where it terminates on a glass end wall of the envelope at the anode end thereof. The capillary tube is nearly coextensive with the envelope having a free end therewithin near the cathode end of the envelope. The free end is coaxially supported by a stiff but resilient spring means from the cathode end cap assembly and thereby from the envelope, of which the cathode end cap assembly forms a part.

A combined thermally conductive liner and cathode electrode is in close contact with the inner surface of the envelope wall over a major portion of the length thereof. The combined cathode electrode and thermally conductive liner serves not only as an electrode from which the plasma discharge takes place, but also as an effective means of equalizing the temperature of the envelope over most of the extent thereof. In this way, differential thermal expansion of various parts of the envelope wall, which would misalign the mirrors, can be avoided to a large extent even during operation in anisotropic temperature environments.

A radioactive source disposed on an inner face of the anode end cap assembly produces ionization of gas molecules in that region to permit ready starting of the laser without excessive starting voltage requirements.

The above and other features, objects and advantages of the present invention, together with the best mode contemplated by the inventor thereof for carrying out his invention will be made clearer by examining the following detailed description of a preferred embodiment and perusing the drawing in which:

BRIEF DESCRIPTION OF THE DRAWING

FIG. 1 is a side view in section of a gas laser in accordance with the present invention;

FIG. 2 is an enlarged sectional view of the left end of the laser of FIG. 1.

FIG. 3 is an enlarged perspective view of the resilient capillary-end support means of FIGS. 1 and 2.

DETAILED DESCRIPTION OF THE PREFERRED EMBODIMENT

In FIG. 1 a gas laser 1 utilizing principles of the present invention is illustrated. A glass envelope 3 forms the principal outer structural element of the laser 1 and may be made for example of a hard borosilicate glass, such as Corning 7052. Such glass types have a high melting point, a relatively low temperature coefficient of expansion, and relatively high thermal conductivity.

Glass envelope 3 is closed at one end by a glass end wall 5 to which is joined a discharge-defining capillary tube 7. Both tube 7 and end wall 5 may be made of the aforementioned borosilicate glass types. Tube 7, end wall 5 and envelope 3 are joined together into a unitary glass structure by fusing at high temperature. A precisely formed capillary bore 9 extends generally coaxially through tube 7 and serves as a plasma-discharge-confining means, as will become apparent in the material which follows on operation of laser 1. A cross bore 11 extends through one wall of tube 7, interconnecting the space surrounding tube 7 within envelope 3 with the space in capillary bore 9.

In accordance with the present invention, an electrically and thermally conductive cathode liner 13 is provided which may comprise a sleeve of type 1100 aluminum alloy, a very pure and highly electrically and thermally conductive grade of aluminum also known as EC aluminum. Liner 13 is typically drawn to an outside diameter which is only slightly smaller, for example by 0.004", than the inner diameter of envelope 3 such that at normal operation temperatures for the laser good thermal contact exists between liner 13 and envelope 3 over major portions of their common surface extent. In this way, liner 13 being an excellent thermal conductor can, in accordance with the present invention, substantially equalize the temperature of envelope 3 during operation of the laser, thus preventing differential thermal expansion of envelope 3.

It will be realized by workers skilled in the art that the utilization of a sleeve of aluminum, drawn to an outside diameter very nearly the same as the inside diameter of envelope 3 is only a preferred way of providing a thermally conductive liner means for equalizing the temperature of the envelope 3. Other workable constructions which lie within the scope of the invention include forming the inner layer of the envelope wall of a medium which is relatively thermally conductive.

Such a construction could be realized in practice by forming the inner layer of the envelope wall by deposition of a conductive material onto the inside surface of a tubular insulative member, resulting in a composite envelope wall structure consisting of an outer layer of insulator, for example glass, and an inner layer of conductor for example a metal.

Similarly, other techniques such as the bonding of a sleeve of a relatively good thermal conductor to the inside surface of a glass envelope wall by using a solder glass or other satisfactory bonding technique could also be used. Careful matching of the thermal coefficients of expansion of the liner and envelope materials would be very important in such a case.

However, such matching of coefficients of expansion is also beneficial even when a separate sleeve is used as a liner means as in the described embodiment. In some cases, for example, the utilization of a composite construction for liner 13, in which the liner consists of a copper sleeve having a thin surface coating of aluminum may be justified in order to secure more intimate contact of liner 13 and envelope 3 over a wide temperature range because of the better match in coefficient of expansion between copper and the borosilicate glasses.

Within the context of the present invention the important criterion is that the thermally conductive liner means be so intimately in contact with major surface portions of the insulative portion of the envelope that substantial thermal equalization takes place even during operation under reasonably foreseeable anisotropic temperature environments. In this way, thermally produced differential expansion and consequent distortion of envelope 3 can be prevented, and the alignment of the mirrors and the capillary bore can remain undisturbed in operation.

At the left end of laser 1 in FIG. 1 is located a cathode end cap assembly 15, the details of which will be described with reference to both FIGS. 1 and 2 for clarity in understanding the interrelationship of the parts. In FIG. 2, particularly, is shown a cup-shaped cathode cap 17 which may be formed by punching and drawing operations from 1100 aluminum stock 0.010" thick. Cathode cap 17 is formed with a slight taper as exaggerated in FIG. 2 such that it fits tightly within cathode liner 13. Since cathode cap 17 operates at cathode potential, all regions to the left of cap 17 are field-free such that the plasma cannot extend into these regions.

A cathode clip 19 is fundamentally a thin conductive disk of, for example, type 302 stainless steel or Inconel type X750. Clip 19 electrically and mechanically interconnects cathode liner 13 with a mirror mounting tube 20 by means of a plurality of bent spring fingers 21 and 21'.

As clearly shown in FIGS. 2 and 3, mirror mounting tube 20 is provided with a secure but compliant mounting means for receiving and supporting a reduced diameter end section 27 of capillary tube 7. This mounting means takes the form of a bore spring 29 comprising a plurality of spring fingers 31, a pair of which are shown in FIG. 2. Spring fingers 31 surround and support end section 27 concentrically within mirror mounting tube 20. Spring fingers 31 provide sufficient compliance so as to easily accept end section 27 within the open end of mirror mounting tube 20, without risk of damage to the relatively delicate capillary tube 7. However, spring fingers 31 also are adequately stiff to provide support of capillary tube 7 against shock and acceleration.

Bore spring 29, as more clearly shown in FIG. 3, consists of a rectangular piece of sheet stock such as 0.010" thick stainless steel or Inconel which has been cut to form spring fingers 31 and then rolled into a generally cylindrical shape. Each of fingers 31 is bent outwardly by about 90° at its tip, and by about 30° approximately midway of its length, such that when spring 29 is compressed slightly and inserted within mirror mounting tube 20, each spring finger is in contact with the surrounding bore only at its tip and root. As a result, the inwardly protruding central regions of fingers 31 form a circumferential region in which end section 27 is firmly but resiliently supported.

A domed cathode end cap 33 forms a portion of cathode end cap assembly 15 and is joined for example by copper brazing to window mounting tube 20. End cap 33 is desirably fabricated of a material which matches the coefficient of thermal expansion of envelope 3 as nearly as is possible. For example in the case of envelope 3 made of the hard borosilicate glasses having a relatively low temperature coefficient of expansion, end cap 33 is preferably made of Kovar.

Cathode end cap assembly 15 is carefully inserted into the open end of envelope 3 such that end section 27 is captured by bore spring 29, while the outer surface of window mounting tube 20 is received within the grip of fingers 21', and cathode end cap 33 fits over the end of envelope 3. In this regard, the ability of bore spring 29 and fingers 21' to securely engage end section 27 and mounting tube 20 without exerting any forces which would tend to interfere with attempts to fully seat end cap 33 over the end of envelope 3 is very important. If end cap 33 does not fully seat on envelope 3, the resulting gaps can make achievement of a good quality hermetic seal between cap 33 and envelope 3 very difficult, if not impossible. Any known satisfactory method of joining end cap 33 to envelope 3 may be employed, such as direct sealing, involving fusion of the glass of envelope 3, or bonding by the use of an intermediate material.

By means of a tubulation 35, which may be made of nickel, the interior of laser 1 after fabrication is first evacuated, baked out to desorb any contaminating gases, whereupon tubulation 35 is "pinched off", hermetically sealing laser 1. Tubulation 35, like mirror mounting tube 20, is typically joined to domed cathode end cap 33 by copper brazing, for example.

A dielectrically coated glass mirror 37 is joined to the end of mirror mounting tube 20 by means of a suitable low temperature solder glass. Suitable choices of material for mirror 37, mirror mounting tube 20, and the solder glass to join them together are as follows: The mirror may be made of Schott BK-1 or BK-7 glass, while mirror mounting tube 20 may be made of an alloy known as "Sylvania No. 4," consisting of 42% nickel, 6% chromium and 52% iron. To join these materials, a suitable solder glass would be Corning 7570 or Owens-Illinois SG-67 or SG-68.

Returning now to FIG. 1, the structure of laser 1 in the region near an anode end cap assembly 39 will be described. Fundamentally, anode end cap assembly 39 is comprised mostly of parts which are similar or identical to those comprising cathode end cap assembly 15. Thus, a mirror mounting tube 41 differs only in minor structural details from mirror mounting tube 20, a domed anode end cap 43 is nearly identical to domed cathode end cap 33, while a dielectrically coated glass mirror 45 may be made of the same material as mirror 37. Moreover, the choice of materials for mirror mounting tube 41 and anode end cap 43 together with the appropriate solder glasses and brazing materials to join these parts together may be the same as in the case of cathode end cap assembly 15.

However, in accordance with the present invention, anode end cap assembly 39 is also provided with means to aid in initiating operation of laser 1. A radioactive source 47 produces ionizing radiation to generate ions of gas in the region of space between domed anode end cap 43 and glass end wall 5. Radioactive source 47 may as indicated be annular in form, or might consist of one or more discrete dots of radioactive material spaced over the inner surface of domed end cap 43. Preferably, radioactive source 47 is in the form of Uranium 238, radioactive Thorium, or Nickel 63, mixed or imbedded in glass which has been fused to the inner surface of anode end cap 43. The radioactive particles produced by these sources serve as a continuous and reliable source of ionization to promote rapid starting of the plasma discharge even in locations where background electromagnetic radiation is absent.

The relatively low level of radiation from source 47 is adequate to cause ionization of gas molecules in the region of space immediately adjacent source 47. The choice of the inside surface of anode end cap 43 as a position for mounting radioactive source 47 is beneficial in order to ensure that the relatively low level of ionization produced by source 47 is maximally effective in initiating the desired discharge along a path extending through the bore of capillary tube 7. However, other locations for the placement of the radioactive material along the plasma discharge path from the anode end cap assembly 39, through the capillary tube 7 to cathode end cap assembly 15 are advantageous also. In particular, deposition on the outer surface of end wall 5 would cause ionization of generally the same volume of gas, between anode cap 43 and end wall 5, as would be ionized by radioactive source 47. Consequently similarly good starting characteristics could be expected when a radioactive source is so placed.

In order to place the laser in operation, a suitable DC power supply (not shown) is connected between anode end cap assembly 29 and cathode end cap assembly 15. Such supplies are readily available from power supply manufacturers, and frequently are of the "DC-to-DC converter" type in current designs. Upon turn-on, the power supply energizes the laser 1 with a high starting voltage, which might be 3500 volts or more. The resultant intense electric field along the axis of the laser 1 causes breakdown, followed by the establishment of a steady plasma discharge, producing the desired output light beam through well-known laser principles.

Although the invention has been described with some particularity in reference to a preferred embodiment which comprises the best mode contemplated by the inventor for carrying out his invention, it will be realized by those skilled in the art that many changes could be made and many apparently different embodiments thus derived without departing from the scope of the invention. Consequently, the scope of the invention is to be determined only from the following claims.

I claim:

1. A gas laser, comprising a hermetically sealed elongated envelope enclosing a generally static gaseous medium capable of supporting stimulated emission of radiation in response to an electric field impressed upon said gaseous medium, electrode means to be energized with a potential difference, disposed spaced apart generally at opposite ends of said envelope to define therebetween an axis along which said electric field extends, a pair of mirrors spaced apart and facing each other along said axis to define therebetween an optical cavity, said mirrors being reflective at a pre-selected wavelength at which said gaseous medium is capable of supporting said stimulated emission of radiation, and a metallic thermally conductive liner means having a significantly greater thermal conductivity than said envelope in good thermally conducting relation with the full inner surface of said envelope over a major portion of the length of said envelope between said mirrors to substantially equalize the temperature of said envelope portion.

2. The gas laser of claim 1, wherein said electrode means are an anode and a cathode, and said thermally conductive liner means provides said cathode.

3. The gas laser of claim 2 wherein said elongated envelope is shaped generally as a hollow cylinder, and said thermally conductive liner means is a hollow cylinder dimensioned to fit closely within said envelope in surface abutting contact therewith.

4. The gas laser of claim 3 wherein said envelope comprises glass, and said thermally conductive liner means comprises aluminum.

5. The gas laser of claim 4 wherein said envelope is mechanically interconnected between said mirrors, and thereby serves as a structural member unifying said mirrors and dimensionally defining said optical cavity.

6. A gas laser of the type which includes an outer envelope and a discharge-path-defining capillary tube, an ionizable gaseous medium capable of sustaining stimulated emission of radiation when ionized within said outer envelope and capillary tube, a cathode and anode energized with a source of potential difference, for establishing an ionizing electric field within said envelope in a direction along the length of said tube, a first mirror disposed at one end of said capillary tube and a second mirror disposed at the other end of said capillary tube, said mirrors being disposed generally on the axis of said capillary tube and generally normal therewith to define an optical cavity within which said stimulated emission takes place, one end of said capillary tube terminating at a wall of said envelope, and a radioactive source for ionization of said gas located in the region of space bounded by said anode, said wall of said envelope, and said capillary tube.

7. The laser of claim 6 wherein said radioactive source is disposed in the region of space bounded by said anode and said envelope wall adjacent the location at which said capillary tube terminates at said wall.

8. The laser of claim 6 wherein said radioactive source is disposed on a surface of said anode facing said location at which said capillary tube terminates at said wall.

9. The laser of claim 6 wherein said radioactive source comprises a material selected from the class consisting of: Uranium 238, radioactive Thorium, and Nickel 63.

10. The laser of claim 6 wherein said radioactive source comprises a radioactive material imbedded in and adhered by a layer of glass.

11. A gas laser of the type which includes an outer envelope and a discharge-path-defining capillary tube, an ionizable gaseous medium capable of sustaining stimulated emission of radiaton when ionized within said outer envelope and capillary tube, means to establish an ionizing electric field within said envelope in a direction along the length of said tube, a first mirror disposed at one end of said capillary tube and a second mirror disposed at the other end of said capillary tube, said mirrors being disposed generally on the axis of said capillary tube and generally normal therewith to define an optical cavity within which said stimulated emission takes place, one end of said capillary tube being supported at an end wall of said envelope and the other end of said capillary tube terminating within said outer envelope, and means immediately adjacent said other end of said tube resiliently supporting said end of said capillary tube from said outer envelope wall generally without any portion of said tube being cantilevered beyond said support.

12. The laser of claim 11 wherein said resilient means comprises an end cap assembly forming one end of said envelope, said end cap assembly defining a recess therewithin in alignment with said other end of said capillary tube, and a bore spring disposed within said recess adapted and dimensioned to circumferentially engage said other end of said capillary tube.

13. The laser of claim 12 wherein said bore spring comprises a plurality of spring fingers circumferentially spaced around the periphery of said capillary tube within said recess, engaging said bore immediately adjacent said end.

14. The laser of claim 12 wherein said bore spring comprises a material selected from the class consisting of stainless steel and Inconel.

* * * * *